United States Patent [19]

Toriumi et al.

[11] 4,349,271
[45] Sep. 14, 1982

[54] IMAGE PROJECTING SYSTEM

[75] Inventors: Shiro Toriumi, Zama; Yutaka Watanabe, Tokyo, both of Japan

[73] Assignee: Minolta Camera Kabushiki Kaisha, Osaka, Japan

[21] Appl. No.: 211,722

[22] Filed: Dec. 1, 1980

[30] Foreign Application Priority Data

Dec. 8, 1979 [JP] Japan ................. 54-159648

[51] Int. Cl.³ .................... G03B 27/70; G02B 27/17
[52] U.S. Cl. ............................ 355/60; 355/8; 350/6.3
[58] Field of Search ............ 355/8, 60, 11, 65, 66, 355/47–51, 55–59, 61, 62, 63, 3 R, 14 R; 350/6.1–6.91, 202

[56] References Cited

U.S. PATENT DOCUMENTS

| | | | |
|---|---|---|---|
| 3,468,817 | 12/1969 | Hubner | 350/202 |
| 3,740,137 | 6/1973 | Sato | 355/66 |
| 3,752,573 | 8/1973 | Miller | 355/66 X |
| 3,884,574 | 5/1975 | Dol et al. | 355/8 X |
| 3,966,319 | 6/1976 | Lang | 355/66 |
| 3,977,260 | 12/1976 | Mihalik et al. | 355/8 |
| 4,126,323 | 11/1978 | Ikeda et al. | 355/8 |
| 4,212,532 | 7/1980 | Suzuki | 355/60 |
| 4,213,690 | 7/1980 | Sugiura et al. | 355/8 X |

FOREIGN PATENT DOCUMENTS

54-52233 4/1979 Japan .
54-122132 9/1979 Japan .

*Primary Examiner*—Arthur C. Prescott
*Attorney, Agent, or Firm*—Wenderoth, Lind & Ponack

[57] ABSTRACT

An image projecting system for transmitting the light rays carrying an image from a support for an original towards an image receiving member through a slit disposed adjacent the image receiving member comprises first, second and third plane reflective mirrors. These mirrors are supported for movement at different velocities in a direction of travel of light rays incident on the first mirror, but in synchronism with each other. During the movement of the first mirror, the reflective surface of the first mirror lies at a predetermined angle larger than 0° but smaller than 90° excepting 45° relative to the above direction. The reflective surface of the second mirror lies at right angles to the above direction during its movement. The reflective surface of the third mirror lies at a predetermined angle, that is, 360° less the first mentioned predetermined angle, relative to the above direction during its movement.

6 Claims, 69 Drawing Figures

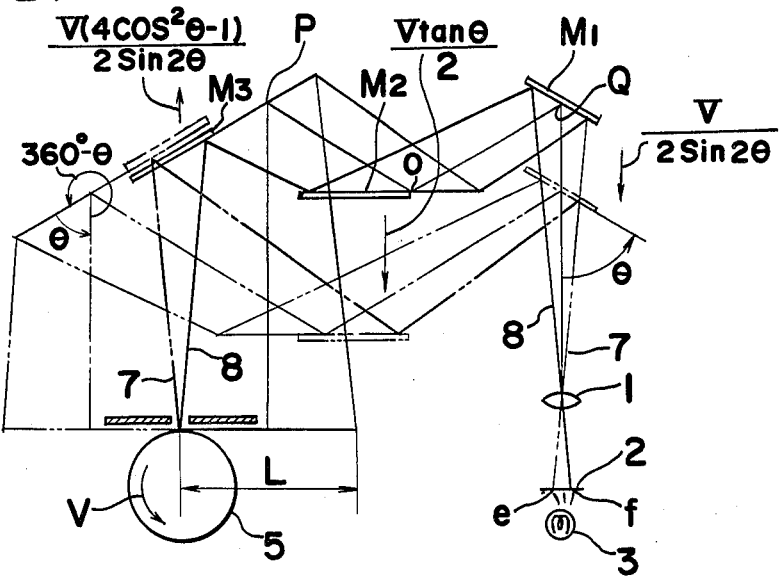
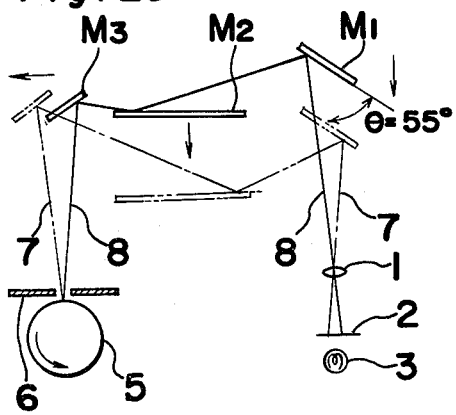
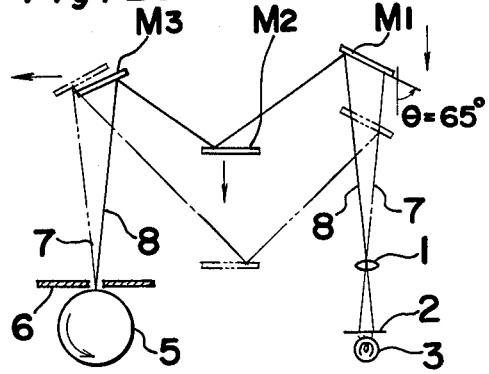
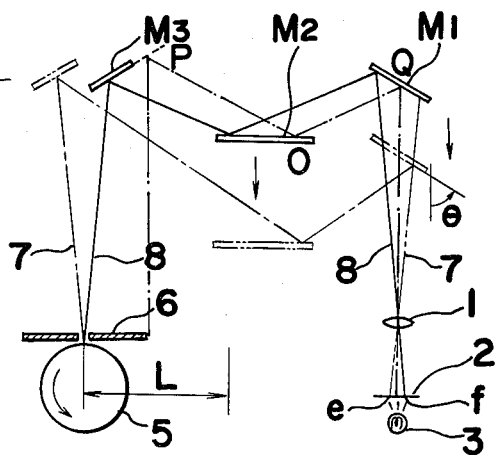

Fig. 28(a)  Fig. 28(b)
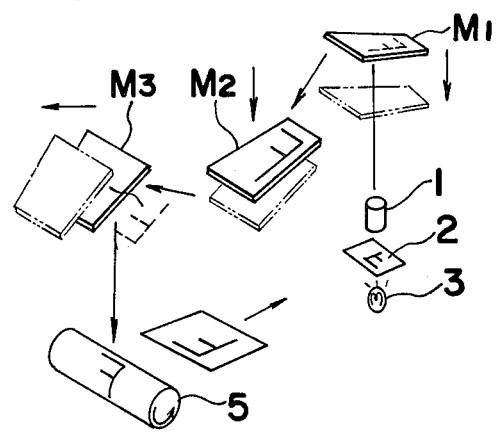 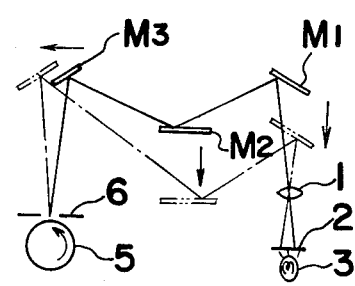
Fig. 29(a)  Fig. 29(b)
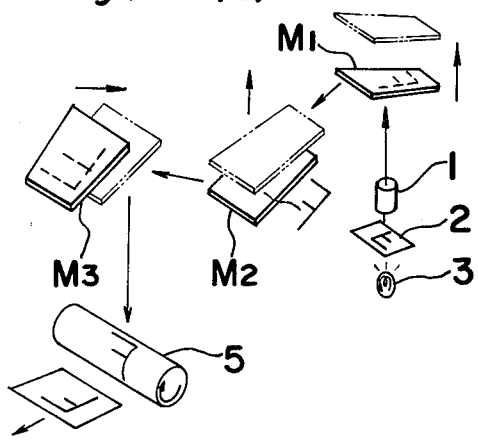 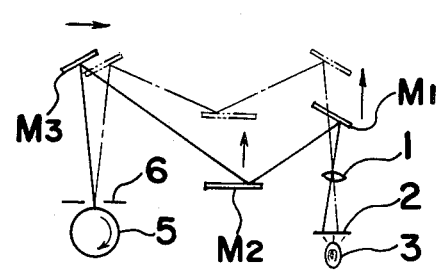
Fig. 30(a)  Fig. 30(b)
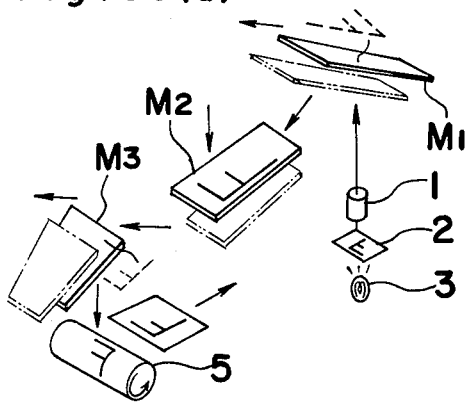 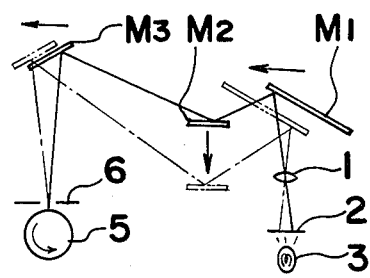

IMAGE PROJECTING SYSTEM

BACKGROUND OF THE INVENTION

The present invention generally relates to an optical image projecting system and, more particularly, to an image projecting system utilizable in a combined microfilm reader-printer apparatus of a type wherein the printer unit employs a slit-exposure type electrophotographic copying machine.

In the conventional combined reader-printer apparatus of a type employing the optical image projecting system wherein the distance of the optical path from the support plane, at which an original is placed, to the image plane where a photoreceptor member forming a part of the electrophotographic copying machine is located for receiving the image of the original projected thereonto by means of a projecting lens system, is fixed and which has a capability of magnifying the image of the original to a desired scale relative to the size of the original image, it is well known to those skilled in the art that adjustment of the magnification of the original image to be, or being, projected onto the image plane and, hence, the photoreceptor member is achieved by adjusting the conjugate distance, replacing the projecting lens system of a given focal length with another projecting lens system of different focal length, or varying the speed ratio of the speed of movement of the original along the support plane relative to the speed of movement of the photoreceptor member along the image plane.

However, in view of the fact that the optical system used in the conventional combined reader-printer apparatus is required to have a relatively large magnifying capability so that an image recorded on a microfilm on a reduced scale can be enlarged and, also, in view of the fact that the speed of movement of the original, that is, the microfilm, is generally low as compared with the speed of movement of the photoreceptor member, a difficulty has heretofore been involved in achieving a synchronization between the speeds of movement of the microfilm and the photoreceptor member. In other words, a difficulty has heretofore been involved in accurately determining the particular speed ratio each time the magnification is changed.

In addition, in view of the fact that scales of the same image recorded on respective microfilms often vary from one microfilm to another, the reader-printer apparatus is required to have a complicated and expensive transmission system effective to change the above described speed ratio where the magnification adjustment is desired to be performed by changing such speed ratio, replacing one lens system with another or adjusting the conjugate distance.

This will be discussed with reference to FIG. 1 of the accompanying drawings which illustrate the principle of the optical system used in the conventional reader-printer apparatus. Referring to FIG. 1, the photoreceptor member is shown in the form of a photoreceptor drum 5, which drum 5 is adapted to be rotated along the image plane 4 in the direction shown by the arrow at a predetermined peripheral velocity V. The image of the original 2, that is, the image on the microfilm, is enlarged by a projecting lens assembly 1 and then projected onto the photoreceptor drum 5 through a slit 6 to form an electrostatic latent image thereon. Assuming that the magnification of the image of the original being enlarged is X, the microfilm must be moved at a velocity of V/X along the support plane in a direction counter to the direction of rotation of the photoreceptor drum 5.

On the other hand, in view of the fact that the size of the image on each frame of the microfilm varies from one microfilm to another according to the difference in microfilm standards, adjustment of the magnification is required in order for all of the images recorded on different microfilms to be projected on the same scale. Accordingly, if the magnification factor X is subsequently changed to a different magnification factor X', not only must the speed of movement of the microfilm be adjusted to V/X', but also either the projecting lens assembly 1 if the projecting lens system is so constituted must be replaced with a different projecting lens assembly 1' or the focal length of a zoom lens if the projecting lens system is so constituted must be adjusted.

In view of the above, while the size of each frame of different microfilms varies from maximum to minimum over a relatively large range, to make the speed of movement of the microfilm to cope with a magnification factor selected in consideration of the range over which the size of each frame varies from one microfilm to another cannot be achieved by a simple speed adjusting means.

SUMMARY OF THE INVENTION

Accordingly, the present invention has been developed with a view to substantially eliminating the disadvantages and inconveniences inherent in the prior art image projecting system and has for its essential object to provide an improved optical image projecting system capable of projecting an image at one of a plurality of magnifications without requiring any corresponding adjustment of the speed of movement of movable members.

Another important object of the present invention is to provide an improved image projecting system of the type referred to above which does not require the employment of any complicated and expensive transmission system which has heretofore been required to achieve the magnification adjustment.

BRIEF DESCRIPTION OF THE DRAWINGS

These and other objects and features of the present invention will become apparent from the following description taken in conjunction with preferred embodiments thereof with reference to the accompanying drawings, in which:

FIGS. 8(a) to 15(a) are perspective views showing an arrangement of mirrors used in the image projecting system according to fifth to twelfth embodiments of the present invention, respectively;

FIGS. 8(b) to 15(b) are diagrams showing respective optical paths in the mirror arrangements shown in FIGS. 8(a) to 15(a);

FIGS. 17(a) to 20(a) are perspective views showing an arrangement of mirrors used in the image projecting system according to thirteenth to sixteenth embodiments of the present invention, respectively;

FIGS. 17(b) to 20(b) are diagrams showing respective optical paths in the mirror arrangements of FIGS. 17(a) to 20(a), respectively;

FIGS. 24 to 27 are diagrams showing seventeenth to twentieth embodiments of the present invention;

FIGS. 28(a) to 37(a) are perspective views showing an arrangement of mirrors used in the image projecting system according to twenty-first to thirtieth embodiments of the present invention, respectively;

FIGS. 28(b) to 37(b) are diagrams showing respective optical paths in the mirror arrangements of FIGS. 28(a) to 37(b);

FIGS. 38(a) to 41(a) are perspective views showing an arrangement of mirrors used in the image projecting system according to thirty-first to thirty-fourth embodiments of the present invention, respectively;

FIGS. 38(b) to 41(b) are diagrams showing respective optical paths in the mirror arrangements of FIGS. 38(a) to 41(a)

DETAILED DESCRIPTION OF THE INVENTION

Figure 1:
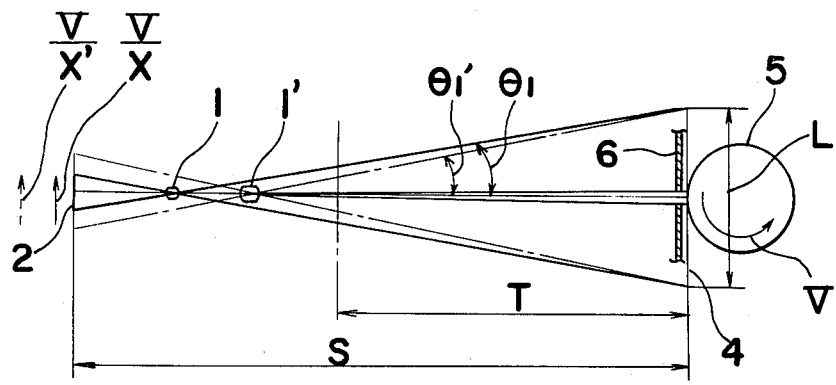
FIG. 1 is a diagram showing the principle of the prior art image projecting system.

Before the description of the present invention proceeds, it is to be noted that like parts are designated by like reference numerals throughout the accompanying drawings.

Figure 2:
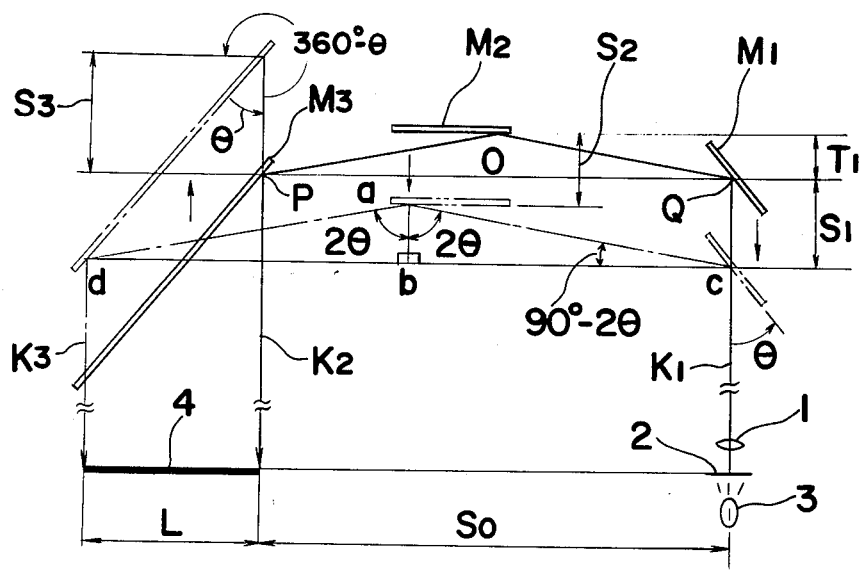
FIG. 2 is a diagram showing the principle of the image projecting system according to the present invention.

Referring first to FIG. 2, there is shown first, second and third reflective mirrors M1, M2 and M3 arranged in a predetermined pattern. The first reflective mirror M1 is movably supported with its reflective surface tilted at an angle $\theta$ relative to the direction of travel of an incident beam of light or the optical axis of the projecting lens assembly 1 while the third reflective mirror M3 is movably supported with its reflective surface tilted at an angle of $(360° - \theta)$ relative to that and held in face-to-face relation to the first reflective mirror M1, the second reflective mirror M2 being movably supported substantially intermediately between the first and third reflective mirrors M1 and M3 with its reflective surface lying in a plane which is parallel to a flat original, for example, a microfilm 2 stationarily held on a support (not shown) and which is perpendicular to the direction of travel of the incident light beam towards the first reflective mirror M1. These mirrors M1, M2 and M3 are so arranged relative to each other that respective points Q, O and P on the reflective mirrors M1, M2 and M3 depict an isosceles triangle, occupying the respective apexes thereof while the line drawn between the points Q and P of reflection forms the base of the isosceles triangle. In addition, the first to third reflective mirrors M1, M2 and M3 are so moved respective distances, shown by S1, S2 and S3, in synchronism with each other in respective directions, shown by the arrows, all parallel to the direction of travel of the incident light beam towards the first reflective mirror M1 that, during the image projection, a triangle $\Delta cad$ similar to the isosceles triangle $\Delta QOP$ can be formed.

Hereinafter, the reason that the distance of the optical path from the microfilm 2 to the image plane 4 via the first to third reflective mirrors M1, M2 and M3 is fixed during the synchronized movement of the mirrors M1, M2 and M3 will be described. Let it be assumed that L represents the distance over which the projecting beam of light reflected by the third mirror M3 towards the image plane 4 and in a direction parallel to the direction of travel of the incident light beam towards the first mirror M1 moves or scans the image plane 4. Then the respective lengths K1, K2 and K3 of the paths for the incident and projecting light beams which intersect the straight line $\overline{cbd}$ remain the same whether at the start of the image projecting operation with the mirrors M1, M2 and M3 held in respective positions shown by the solid lines or whether at the time of completion of the image projecting operation with the mirrors M1, M2 and M3 held in respective positions as shown by the chain lines. Therefore, in order to keep constant the distance of the optical path from the microfilm 2 to the image plane 4 via the reflective mirrors M1, M2 and M3 throughout the entire image projecting operation, it is necessary to keep at a constant value a portion (l) of the distance of the optical path not commonly utilized at the time of start of the image projecting operation and at the time of completion of the image projecting operation. Accordingly, in the image projecting system of the present invention, it must satisfy the following equations.

In view of a portion of the optical path shown by the solid line in a portion of FIG. 2 above the straight line $\overline{cbd}$, $$l = 2S1 + So/\sin 2\theta \tag{1}$$

In view of a portion of the optical path shown by the chain line in a portion of FIG. 2 above the straight line $\overline{cbd}$, $$l = (So + L)/\sin 2\theta \tag{2}$$

From the equations (1) and (2) above, $$S1 = L/(2 \cdot \sin 2\theta) \tag{3}$$

On the other hand, $$(T1 + S1) - S2 = \frac{1}{2}(So + L) \cdot \tan(90° - 2\theta) \tag{4}$$

$$T1 = So/(2 \cdot \tan 2\theta) \tag{5}$$

From the equations (3), (4) and (5) above, $$S2 = \frac{1}{2}\{So/\tan 2\theta + L/\sin 2\theta - (So + L) \cdot \tan(90° - 2\theta)\}$$
$$= L \cdot \tan \theta/2$$
$$S1 + S3 = L/\tan \theta \tag{6}$$

From the equations (5) and (6) above, $$S3 = L/\tan \theta - L/2 \cdot \sin 2\theta$$
$$= L(4 \cos^2 \theta - 1)/2 \cdot \sin 2\theta$$

If the image projecting system according to the present invention is so designed as to satisfy the above described equations, the image of the length L can be successively projected onto the image plane 4 while the distance of the optical path from the microfilm 2 to the image plane 4 via the mirrors M1, M2 and M3 remains the same throughout the entire impage projecting operation.

The above described principle accounts that the synchronized movement of the mirrors M1, M2 and M3 results in movement of the image, that is projected onto the image plane 4, over a distance shown by L in FIG. 2. In the arrangement shown in FIG. 1, the movement of the projected image on the image plane over the distance L can be achieved by interrupting the movement of the microfilm 2, and moving the microfilm 2 together with the projecting lens assembly 1 over the distance L in a direction downwardly of the drawing of FIG. 1 so that the image can be shifted the distance L relative to the photoreceptor drum 5 and the slit 6.

Accordingly, even though the lens assembly 1 is replaced with the lens assembly 1' to effect change in magnification, consecutive portions of the image on the microfilm, the magnification of which has been determined by the replaced lens assembly 1' can successively projected onto the drum 5 through the slit 6 without changing the peripheral velocity of the drum 5 being then rotated. It is to be noted that each of the consecutive portions of the image so projected is in the form of a ribbon of a size determined by the side of the slit 6.

In view of the employment of the principle described with particular reference to FIG. 2, the image projecting system embodying the present invention is effective to project the substantially ribbon-shaped consecutive portions of the image onto the image plane without requiring any change or adjustment of the speed of movements of movable members such as the reflective mirrors M1, M2 and M3 and the photoreceptor member, even though the projecting lens assembly of one focal length has been replaced with that of another focal length or the focal length of the zoom lens assembly has been changed.

The first embodiment of the present invention will now be described with reference to FIG. 3.

Figure 3:
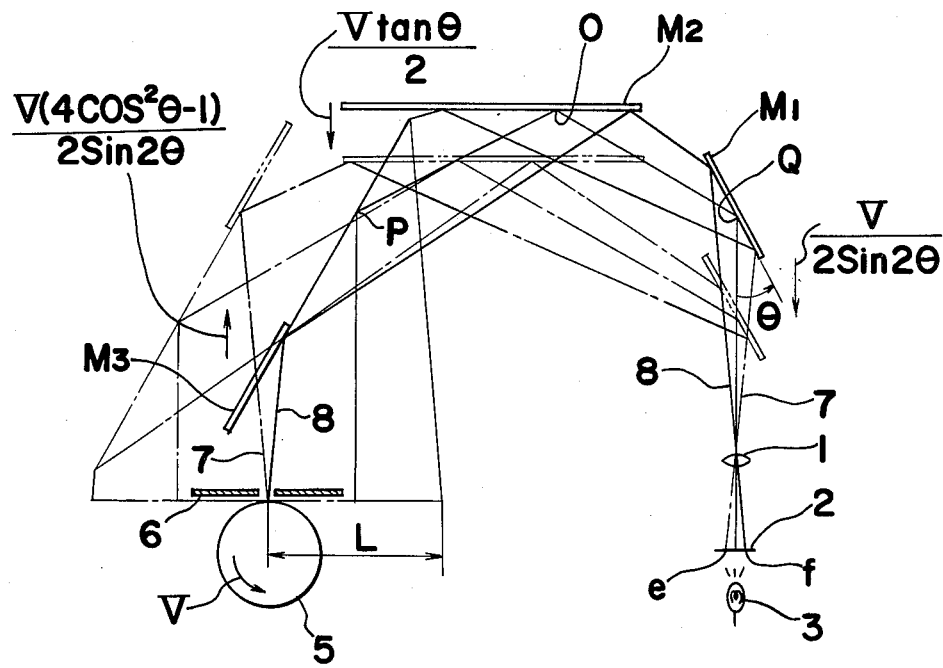
FIGS. 3 to 6 are diagram showing the image projecting system according to first to fourth embodiments of the present invention.

Referring to FIG. 3, an image of a picture recorded at one edge portion f of the microfilm 2 illuminated by a source of light, for example, a lamp 3, which microfilm 2 is stationarily supported, is enlarged by the projecting lens assembly 1 and projected onto the outer surface of the photoreceptor drum 5 through the slit 6 in the form of a bundle of light rays 8 after having been successively reflected by the first, second and third mirrors M1, M2 and M3 which are positioned at respective positions shown by the solid lines at the time of start of the image projecting operation. At the time of completion of movement of the first, second and third mirrors M1, M2 and M3 to the respective positions, shown by the chain lines, in the directions shown by the arrows, the image of a picture recorded at the opposite edge portion e of the microfilm 2 illuminated by the lamp 3 is enlarged by the projecting lens assembly 1 and projected onto the outer surface of the photoreceptor drum 5 through the slit 6 in the form of a bundle of light rays 7 after having been successively reflected by the first, second and third mirrors M1, M2 and M3.

This accounts that, in view of the fact that the image projecting path including the bundles of light rays 7 and 8 is moved a distance L equal to the length of a projected image corresponding to the picture on one frame of the microfilm 2 by the movement of the first, second and third mirrors M1, M2 and M3, generally ribbon-shaped consecutive portions of the image of the picture on one frame of the microfilm 2 are successively projected through the slit 6 onto the photoreceptor drum 5. It is to be noted that bundles of light rays shown by the respective fine lines in FIG. 3 are depicted for the purpose of illustration of the length L and do not participate in the actual image projection and that the path of travel of the bundles of light rays referred to above is depicted on the assumption that the third reflective mirror M3 is larger in size than that shown in FIG. 3.

In the arrangement shown in FIG. 3, assuming that V represents the velocity of movement of the surface of the photoreceptor drum 5, the time to required for the surface of the photoreceptor drum 5 to move a distance corresponding to the length L is expressed by the equation, to=L/V. On the other hand, since the distances of movement of the associated first, second and third mirrors M1, M2 and M3 in the direction parallel to any one of the incident and projecting beams of light are respectively expressed by L/2 sin 2θ, L tan θ/2 and L(4 cos² θ−1)/2 sin 2θ, the respective times t1, t2 and t3 required for the first, second and third mirrors M1, M2 and M3 to move in synchronism with and during the movement of the photoreceptor drum 5 over the distance corresponding to the length L are expressed as follows, provided that V1, V2 and V2 represent the respective speeds of movement of the first, second and third mirrors M1, M2 and M3.

t1=L/2V1 sin 2θ,
t2=L tan θ/2 V2, and
t3=L(4 cos ²θ−1)/2 V3 sin 2θ.

Since the times t0, t1, t2 and t3 must be equal to each other in order for the movement of the first, second and third mirrors M1, M2 and M3 to be synchronized with the movement with the photoreceptor drum 5, the image projecting system according to the present invention must satisfy the requirements that the respective speeds of movement of the first, second and third mirrors M1, M2 and M3 be substantially V/2 sin 2θ, V tan θ/2 and −V(4 cos² θ−1)/2 sin 2θ in the direction of the incident beam of light.

From the foregoing, it is clear that, even where the zoom lens assembly is employed in place of the projecting lens assembly 1 or the lens assembly of a focal length different from that of the projecting lens assembly 1 is employed, the image of the picture recorded on one frame of the microfilm 2 can consecutively be projected onto the photoreceptor drum 5 without requiring any adjustment of the speed of movement of any one of the mirrors M1, M2 and M3 and the photoreceptor drum. This applies not only to the embodiment shown in FIG. 3, but also to other embodiments of the present invention which will follow.

Figure 4:
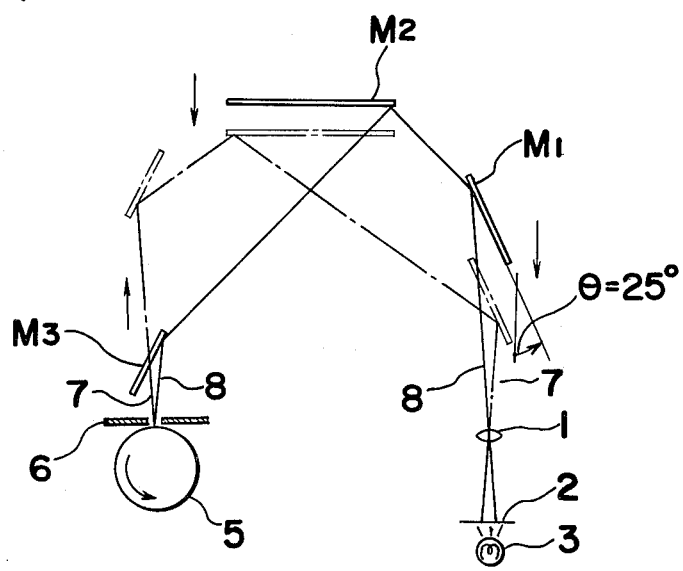
Figure 5:
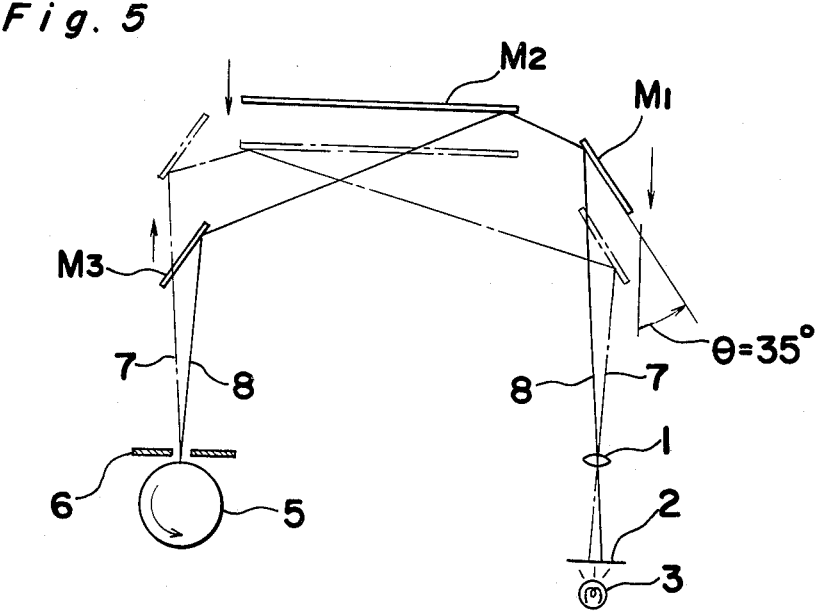

FIGS. 4 and 5 illustrate second and third embodiments of the present invention, respectively, wherein the first and third mirrors M1 and M3 are so supported as to incline at the same angle θ relative to the optical axes on respective sides of the projecting lens assembly 1 and the photoreceptor drum 5, it being to be understood that the direction of inclination of the first mirror M1 is in opposite relation to that of the third mirror M3. The difference between the embodiments of FIGS. 4 and 5 resides in that the angle of inclination of the first and third mirrors M1 and M3 are 25° and 35° in the respective embodiments of FIGS. 4 and 5.

Figure 6:
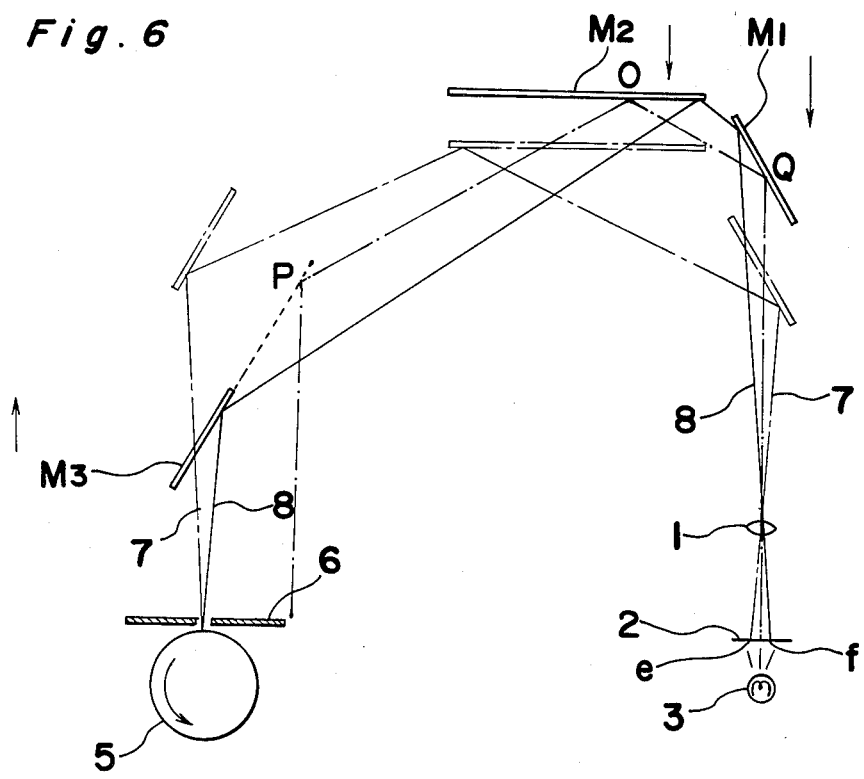

While the embodiment shown in FIG. 3, at the start of the image projecting operation, the mirrors M1, M2 and M3 have been described and shown as positioned so that the points of reflection Q and P on the first and third mirrors M1 and M3 lie in symmetrical relation to each other with respect to the imaginary line drawn at right angles to the second mirror M2 and passing through the point of reflection 0 on the second mirror M2, this symmetrical relation may not be necessary, an example of which is shown in FIG. 6 illustrating the fourth embodiment of the present invention.

FIGS. 8 to 15 and 17 to 20 illustrate various relationships among the directions of movement of the first, second and third mirrors M1, M2 and M3, the corresponding direction of rotation of the photoreceptor drum 5 and the direction of transportation of a copying paper when the image projecting system of the present invention is applied to a reader-printer apparatus comprising reader and printer units.

Figure 7:
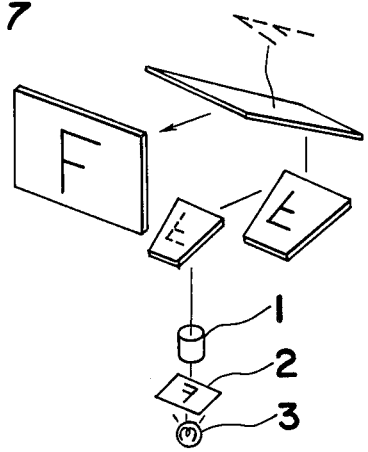
FIG. 7 is a perspective view showing an arrangement of mirrors used in a reader unit of a combined reader-printer apparatus to which the concept of the present invention is applied.

In the reader unit, since the image of a picture on one frame of the microfilm is carried by rays of light having passed through the frame of the microfilm, by suitably selecting the number of plane reflective mirrors disposed on the path of travel of the light rays carrying the image of the picture it is possible to form an erect and normal projected image irrespective of whether the microfilm is placed with its front side facing the lamp or with its back side facing the lamp. This is illustrated in FIGS. 7 and 16. Specifically, FIG. 7 illustrates the example wherein an odd number of, for example, three, plane reflective mirrors are employed to project the image of a figure "F" onto a projecting screen S when the microfilm 2 bearing such figure "F" is placed with its front-side facing the lamp 3, whereas FIG. 16 illustrates the example wherein an even number of, for example, two, plane reflective mirrors are employed to project the image of the figure "F" onto the projecting screen S when the microfilm 2 bearing such figure is placed with its back-side facing the lamp 3. It is to be noted that, in FIGS. 7 to 20, the figure "F" depicted by the broken line accounts that the image of such figure is reflected by the reflective surface of the plane mirror, which reflective surface is not visible in the corresponding drawings, whereas the figure "F" depicted by the solid line accounts that the image of such figure is reflected by the reflective surface of the plane mirror in the form as presented in the corresponding drawings.

However, in the printer unit of the reader-printer apparatus to which the image projecting system of the present invention is applied, the direction of scan of the picture on one frame of the microfilm 2, the direction of rotation of the photoreceptor drum 5 and the number of plane reflective mirrors are essentially corelated with one another in order to achieve the reproduction of the picture on the copying paper in erect and normal and this will be discussed with reference to FIGS. 8 to 15 which illustrate respective fifth to twelfth embodiments of the present invention.

FIGS. 8(a) and 8(b) and FIGS. 9(a) and 9(b) illustrate respective examples wherein the first, second and third mirrors M1, M2 and M3 are supported for movement in a direction perpendicular to the microfilm 2. FIGS. 10(a) and 10(b) and FIGS. 11(a) and 11(b) illustrate respective examples wherein the first and third mirrors M1 and M3 are supported for movement in a direction parallel to the microfilm 2 while the second mirror M2 positioned substantially intermediately between the first and third mirrors M1 and M3 is supported for movement in a direction perpendicular to the microfilm 2, it being to be noted that points of reflection Q and P on the first and third mirrors M1 and M3 are, during the movement of the first and third mirrors M1 and M3 in the direction parallel to the microfilm 2, moved in a direction substantially parallel to the path of travel of the incident beam of light at respective velocities of $V/2 \sin 2\theta$ and $-V(4 \cos^2 \theta - 1)/2 \sin 2\theta$ as discussed in connection with the principle of the present invention.

Figure 14A:
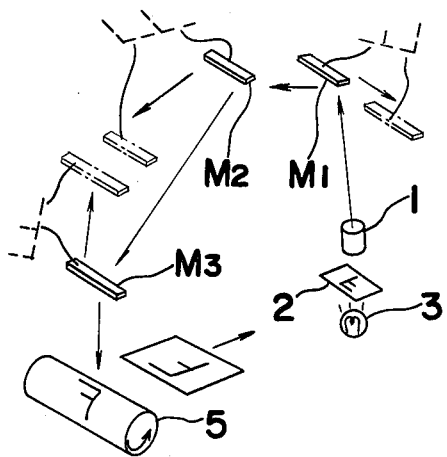
Figure 14B:
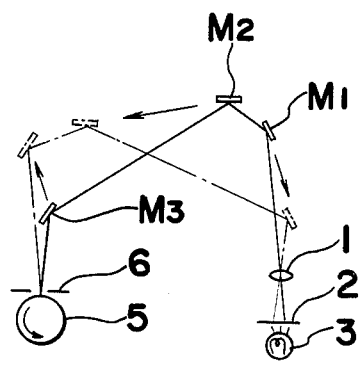

The embodiments respectively shown in FIGS. 12(a) and 12(b) and FIGS. 13(a) and 13(b) correspond respectively to that shown in FIGS. 10(a) and 10(b) and FIGS. 11(a) and 11(b), except for a fixed, fourth plane reflective mirror M4 is additionally employed. FIGS. 14(a) and 14(b) illustrate the example wherein each of the first, second and third mirrors M1, M2 and M3 are employed in the form of a plane reflective mirror having a minimum width, in which case the first, second and third mirrors of minimum width are required to move in a diagonal direction a larger distance than that required in any one of the foregoing embodiments.

Figure 15A:
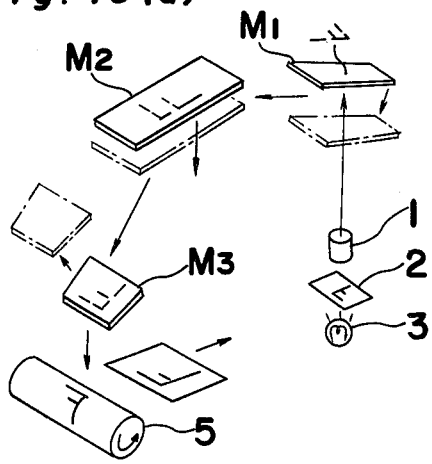
Figure 15B:
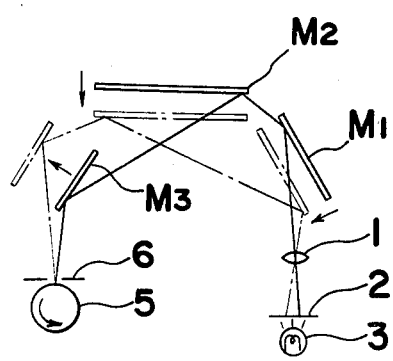
Figure 16:
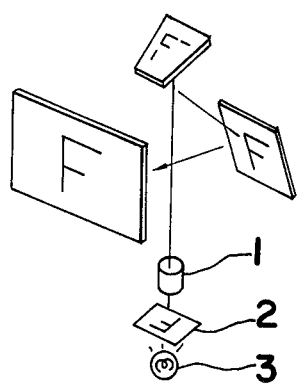
FIG. 16 is a perspective view showing a different arrangement of mirrors used in the reader unit of the combined reader-printer apparatus to which the concept of the present invention is applied.

FIGS. 15(a) and 15(b) illustrate the example wherein the first, second and third mirrors M1, M2 and M3 are supported for movement in respective directions perpendicular to the plane of the reflective surfaces of the corresponding first, second and third mirrors M1, M2 and M3 so that each of the first, second and third mirrors M1, M2 and M3 can be moved a smaller distance than that required in any one of the foregoing embodiments. For this purpose, each of the first, second and third mirrors M1, M2 and M3 should be employed in the form of a plane reflective mirror of relatively large width.

In any event, the image projecting system according to any one of the foregoing embodiments shown in FIGS. 8(a) and 8(b) to FIGS. 15(a) to 15(b) is utilizable in the reader-printer apparatus wherein the reader unit is constructed such as shown in FIG. 7 and utilizes an odd number of plane reflective mirrors. However, the image projecting system utilizable in the reader-printer apparatus wherein the reader unit is constructed such as shown in FIG. 16 and utilizes an even number of plane reflective mirrors is illustrated from FIGS. 17(a) and 17(b) to FIGS. 20(a) and 20(b).

It is to be noted that the respective embodiments of FIGS. 17 to 20 are similar to that shown in FIGS. 8 to 11, except for differences appearing in the direction of rotation of the drum 5 and the direction of transportation of the copying paper. As shown, the direction of rotation of the drum 5 and the direction of transportation of the copying paper, both employed in the embodiments of FIGS. 17 to 20, are opposite to that employed in the embodiments of FIGS. 8 to 11. In view of this, although not shown, it is to be understood that, if the direction of rotation of the drum 5 and the direction of transportation of the copying paper, which are employed in the embodiments of FIGS. 12 to 15, are reversed, the resultant image projecting system according to each of the embodiments of FIGS. 12 to 15 can be used in the printer unit of the reader-printer apparatus of the type having the reader unit composed of the even number of, for example, two, plane reflective mirrors.

It is to be noted that the embodiments respectively shown in FIGS. 8 to 15 and 17 to 20 are mere representatives of the concept of the present invention and, accordingly, a combination of these embodiments is possible to those skilled in the art. By way of example, where the first, second and third mirrors M1, M2 and M3 are respectively moved relative to the optical axis of the projecting lens assembly 1, substantially at speeds of V/2 sin 2θ, V tan 2θ/2 and −V(4 cos² θ − 1)2 sin 2θ, the width of each of the first, second and third mirrors M1, M2 and M3, the direction of movement thereof and/or the distance over which each of the first, second and third mirrors M1, M2 and M3 is to be moved can be selected in any suitable manner.

Although in the prior art reader-printer apparatus, the number of plane reflective mirrors utilized in the optical system of the printer unit thereof has heretofore been determined in dependence on the number of plane reflective mirrors utilized in the optical system of the reader unit thereof and, in other words, the manner in which the microfilm can be placed relative to the light source, the reader-printer apparatus wherein the image projecting system of the present invention is utilized in its printer unit does not require for one to consider the above described dependence because, should the number of the plane reflective mirrors used in the optical system of the reader unit and that employed in the optical system of the printer unit differ from each other, the problem associated therewith can be solved merely by changing the direction of rotation of the photoreceptor drum 5, the direction of transportation of the copying paper and the direction of scan of the picture recorded on the microfilm 2. In other words, as can readily be understood from FIGS. 8 to 15 and 17 to 20, the number of the plane reflective mirrors used in the optical system of the printer unit of the reader-printer apparatus of which the reader unit is so designed as to require the microfilm to be placed with its front-side facing towards the lamp in order to obtain the projected image in erect and normal on the projecting screen and that used in the optical system of the printer unit of the reader-printer apparatus of which the reader unit is so designed as to require the microfilm to be placed with its back-side facing the lamp for the same purpose remain the same even though the number of the plane reflective mirrors used in the optical system of the reader unit may differ. So to speak, in the image projecting system of the present invention, the projection of the image in either erect or reverted is possible with neither increasing nor decreasing the number of the plane reflective mirrors used.

Figure 8A:
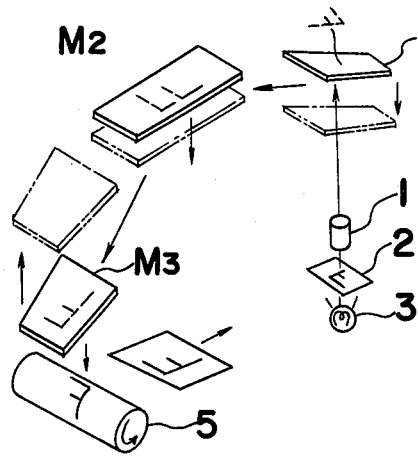
Figure 8B:
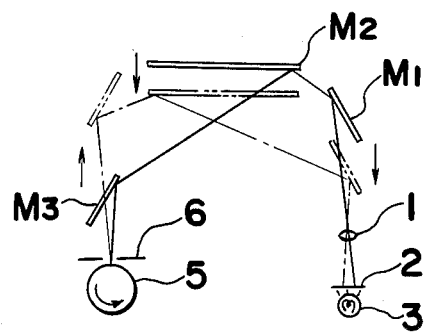
Figure 9A:
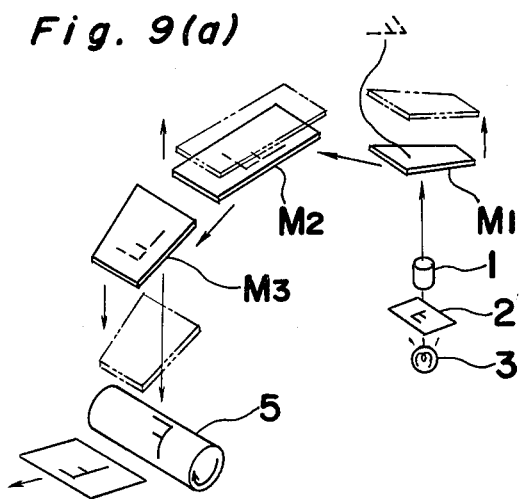
Figure 9B:
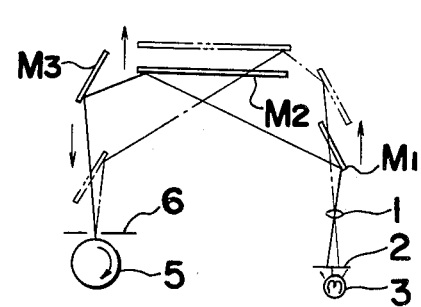
Figure 10:
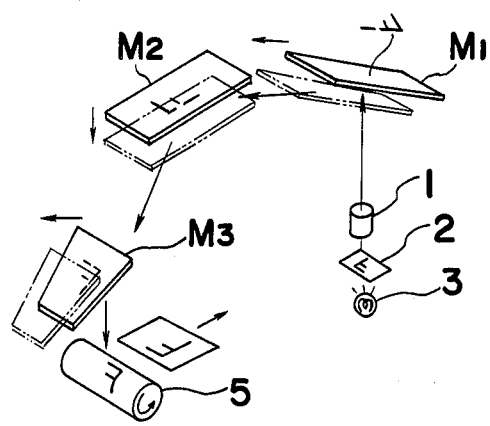
Figure 10:
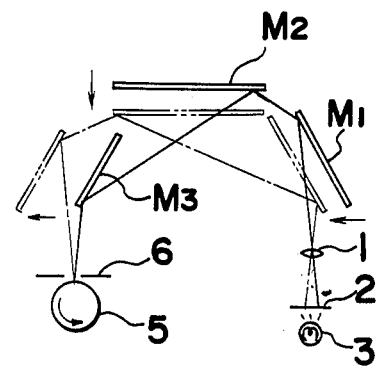
Figure 11:
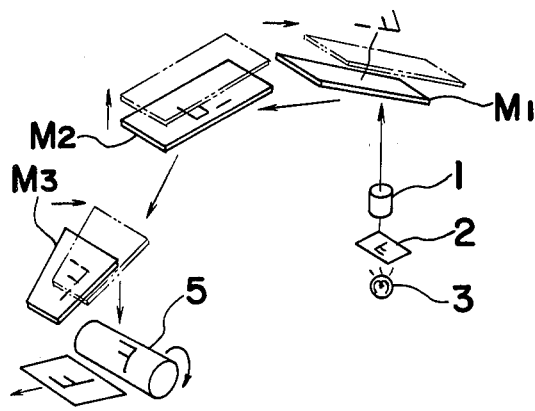
Figure 11:
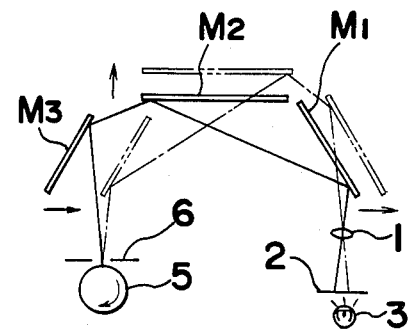
Figure 12:
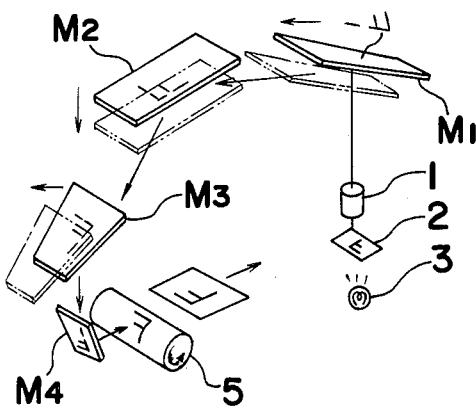
Figure 12:
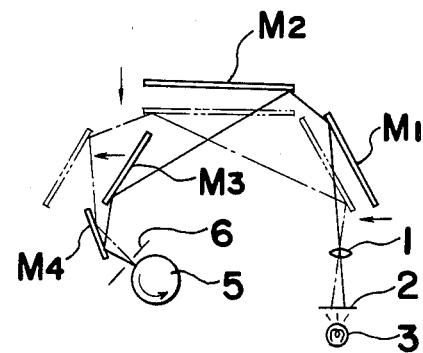
Figure 13A:
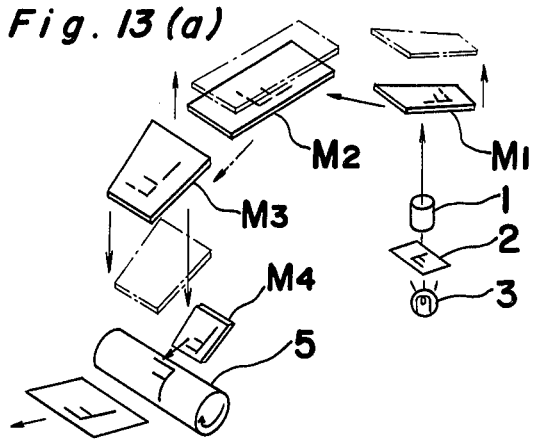
Figure 13B:
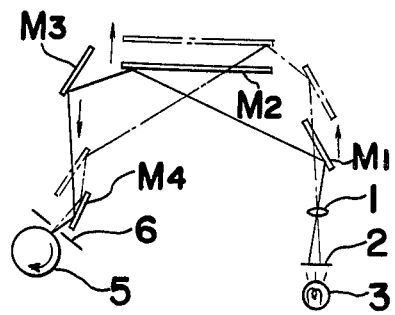
Figure 21:
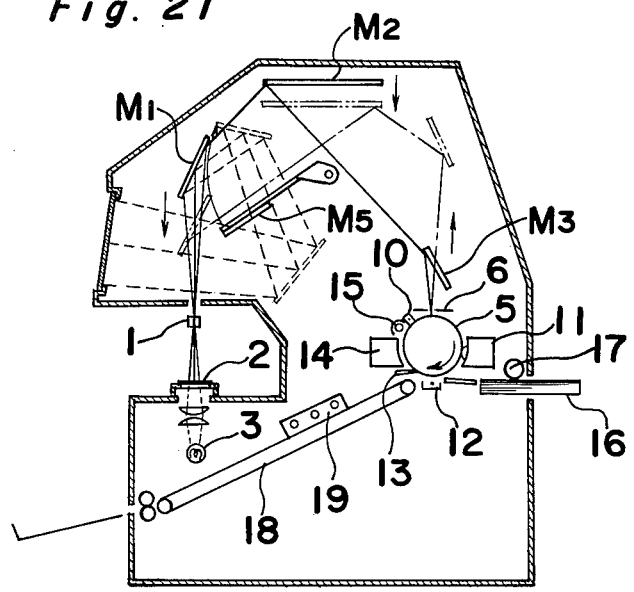
FIGS. 21 and 22 are schematic side sectional views of the combined reader-printer apparatus employing the image projecting apparatus according to the present invention.

FIG. 21 illustrates schematically the reader-printer apparatus of a type utilizing three plane reflective mirrors in the optical system of the reader unit and three plane reflective mirrors M1, M2 and M3 in the printer unit, it being to be noted that the mirror M1 is concurrently used as one of the three mirrors in the optical system of the reader unit. The mirrors M1, M2 and M3 are arranged in the manner as shown in FIGS. 8(a) and 8(b).

Figure 17A:
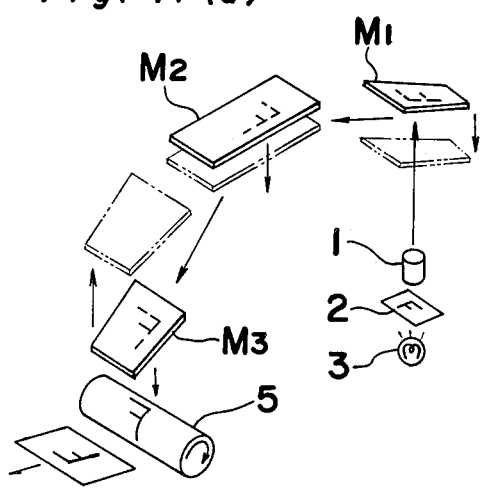
Figure 17B:
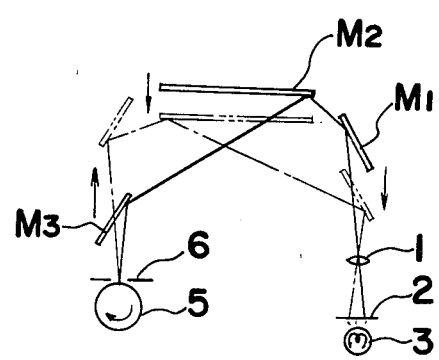
Figure 18A:
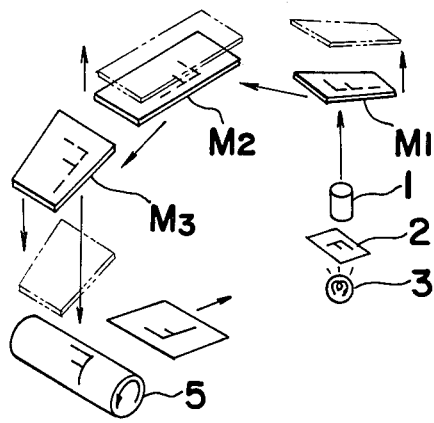
Figure 18B:
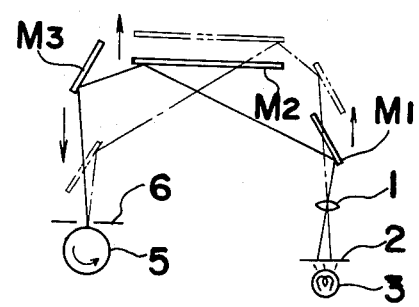
Figure 19A:
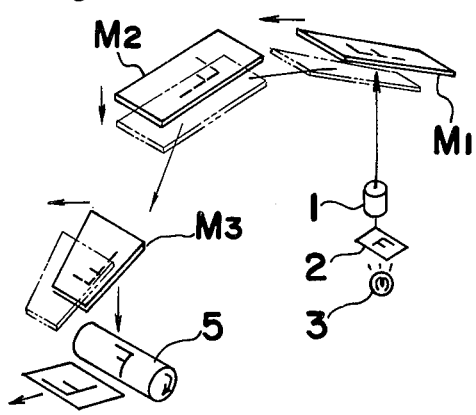
Figure 19B:
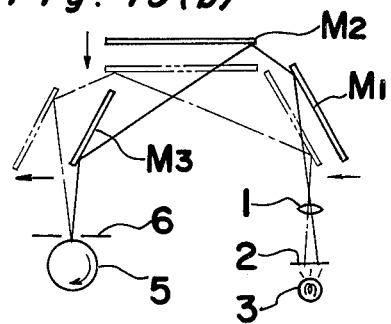
Figure 20A:
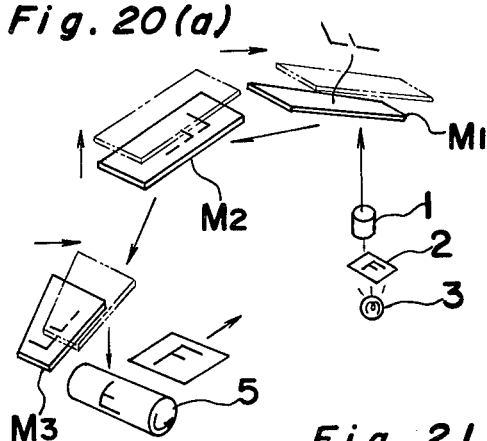
Figure 20B:
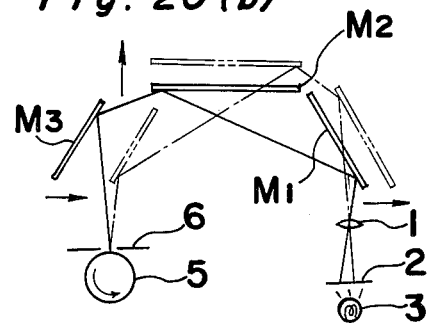
Figure 22:
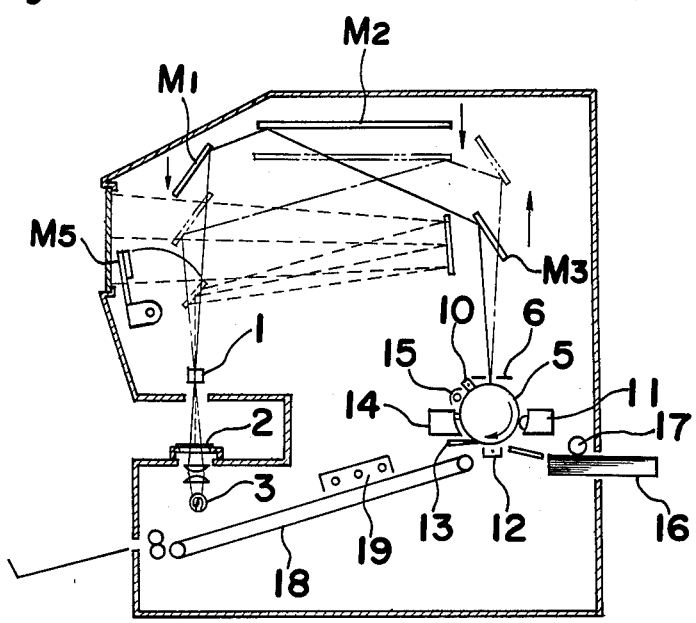

On the other hand, FIG. 22 illustrates schematically the reader-printer apparatus of a type utilizing two plane reflective mirrors in the optical system of the reader unit and three plane reflective mirrors M1, M2 and M3 in the printer unit, said mirrors M1, M2 and M3 being arranged in the manner as shown in FIGS. 17(a) and 17(b).

In both of the apparatuses shown respectively in FIGS. 21 and 22, a plane reflective mirror M5 used in the optical system of the reader unit is pivotally supported for movement between operative and inoperative positions respectively shown by the solid and broken lines, said mirror M5 being pivoted to the inoperative position to clear the optical axis of the optical system of the printer unit when the latter is brought into operation.

In addition to the optical system discussed above, the printer unit of the reader-printer apparatus shown in any one of FIGS. 21 and 22 includes an electrophotographic copying machine of any known construction. So far illustrated, the electrophotographi copying machine is shown as including an electrostatic charger 10, a developing device 11, a transfer charger 12, a separator blade 13, a cleaner 14 and an eraser lamp 15, all being arranged adjacent to and around the photoreceptor drum 5, the operation and arrangement of which are well known to those skilled in the art. The copying machine also includes a paper cassette 16 containing a stack of copying papers, paper feed roller assembly 17, an endless delivery belt 18 and a fixing device 19, said cassette 16 and said roller assembly 17 being arranged on one side, for example, right-hand side as viewed in any one of FIGS. 21 and 22, of the photoreceptor drum 5 while said belt 18 and device 19 are arranged on the other side or left-hand side of the photoreceptor drum 5.

The image projecting system according to the principle shown in FIG. 2 or according to any one of the foregoing embodiments is such that the first mirror M1 is inclined at the angle θ relative to the incident beam of light, wherein the angle θ is larger than 0°, but smaller than 45°. However, in the following embodiments of the present invention, the image projecting system makes use of the first mirror M1 so supported as to incline relative to the incident beam of light at an angle θ larger than 45°, but smaller than 90°, and this will now be described. It is to be noted that, where the first mirror M1 is inclined at the angle θ larger than 0°, but smaller than 45° such as in the image projecting system according to the foregoing embodiments, the optical path extending from the lamp 3 to the image plane 6 or the photoreceptor drum 5 represents a configuration substantially similar to the shape of a gambrel roof and, in contrast thereto, where the first mirror M1 is inclined at the angle θ larger than 45°, but smaller than 90° such as in the image projecting system according to the subsequently described embodiments, the same optical path represents a configuration substantially similar to the shape of a figure "M". Even though there is a difference in configuration of the optical path from the lamp 3 to the photoreceptor drum 5 as hereinabove described, the respective velocities at which the first, second and third mirrors M1, M2 and M3 are required to move remain the same, that is, V/2 sin 2θ, V tan θ/2 and −V(4 cos² θ − 1)/2 sin 2θ relative to the optical axis of the lens assembly 1.

Figure 23:
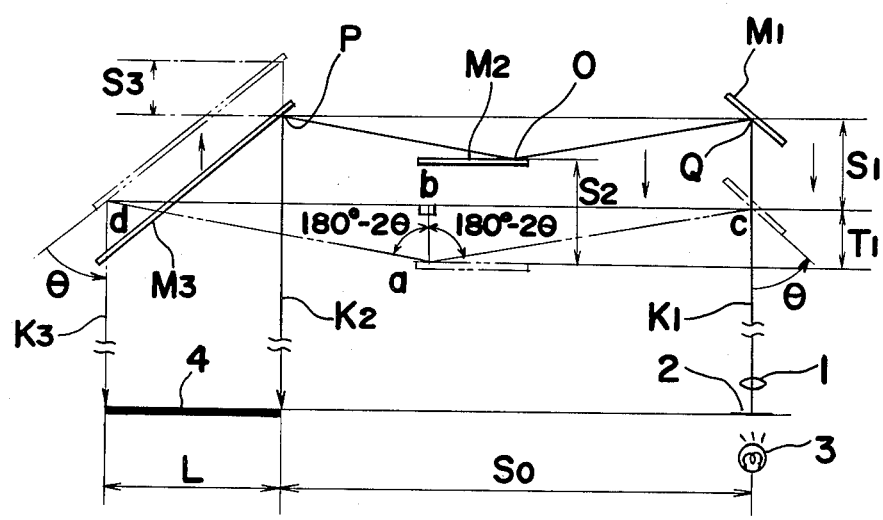
FIG. 23 is a diagram similar to FIG. 2, showing another principle of the image projecting system of the present invention.
Figure 31A:
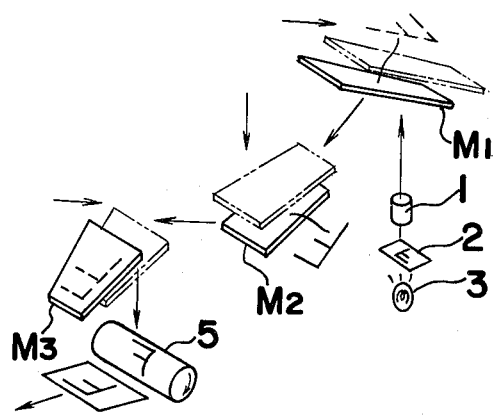
Figure 31B:
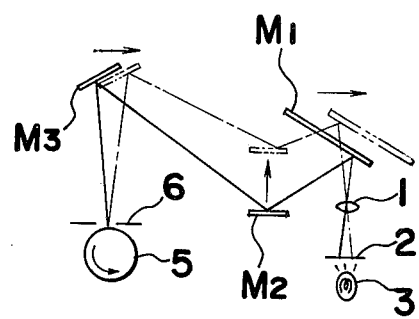

The principle of the present invention wherein the first mirror M1 is so supported as to incline at the angle θ larger than 45° but smaller than 90° is shown in FIG. 23 and is employed in any one of the following embodiments respectively shown in FIGS. 24 to 41.

FIG. 24 illustrates the seventeenth embodiment of the present invention.

FIGS. 25 and 26 illustrate eighteenth and nineteenth embodiments of the present invention, respectively, wherein the first and second mirrors M1 and M3 are so supported at to incline at the same angle σ relative to the optical axis of the projecting lens assembly 1, it being to be understood that the direction of inclination of the first mirror M1 is in opposite relation to that of the third mirror M3. The difference between the embodiments of FIGS. 25 and 26 resides in that the angle of inclination of the first and third mirrors M1 and M3 are 55° and 65° in the respective embodiments of FIGS. 25 and 26.

FIG. 27 illustrates the twentieth embodiment of the present invention wherein, at the start of the image projecting operation, the mirrors M1, M2 and M3 are so positioned that the points of reflection Q and P on the first and third mirrors M1 and M3 lie in unsymmetrical relation to each other with respect to the imaginary line drawn at right angles to the second mirror M2 and passing through the point of reflection 0 on the second mirror M2.

FIGS. 28 to 41 illustrate various relationships among the directions of movement of the first, second and third mirrors M1, M2 and M3, the corresponding direction of rotation of the photoreceptor drum 5 and the direction of transportation of a copying paper, it being to be noted that any one of the embodiments respectively shown in FIGS. 28(a) and 28(b) to FIGS. 37(a) and 37(b) is utilizable where the reader unit is so designed as to accommodate the mirofilm 2 in the manner as shown in FIG. 7 while any one of the embodiments respectively shown in FIGS. 38(a) and 38(b) to FIGS. 41(a) and 41(b) is utilizable where the reader unit is so designed as to accommodate the microfilm 2 in the manner as shown in FIG. 16.

FIGS. 28(a) and 28(b) and FIGS. 29(a) and 29(b) illustrate the twenty-first and twenty-second embodiment of the present invention wherein the first and second mirrors M1 and M2 are supported for movement in a direction perpendicular to the microfilm 2 while the third mirror M3 is supported for movement in a direction parallel to the microfilm 2. FIGS. 30(a) and 30(b) and FIGS. 31(a) and 31(b) illustrate the twenty-third and twenty-fourth embodiments of the present invention, respectively, wherein the first and third mirrors M1 and M3 are supported for movement in a direction parallel to the microfilm 2 while the second mirror M2 is supported for movement in a direction perpendicular to the microfilm 2. FIGS. 32(a) and 32(b) and FIGS. 33(a) and 33(b) illustrate the twenty-fifth and twenty-sixth embodiments of the present invention, respectively, wherein all of the first, second and third mirrors M1, M2 and M3 are supported for movement in a direction perpendicular to the microfilm 2.

FIGS. 34(a) and 34(b) and FIGS. 35(a) and 35(b) illustrate the twenty-seventh and twenty-eighth embodiments of the present invention, respectively, which are respectively similar to FIGS. 30(a) and 30(b) and FIGS. 33(a) and 33(b), except for a fixed, fourth plane reflective mirror M4 is additionally employed.

Figure 36A:
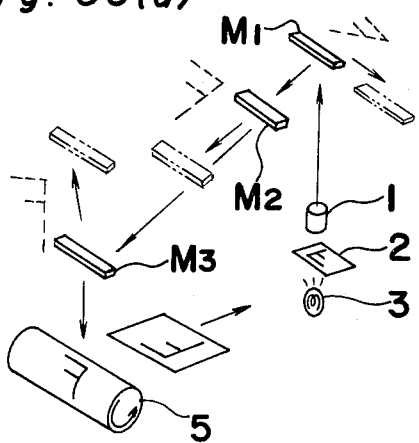
Figure 36B:
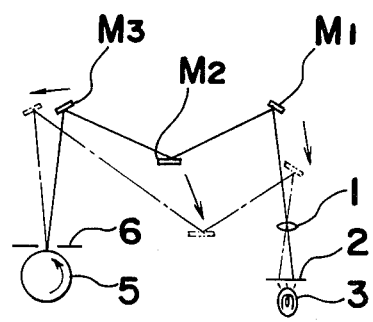

FIGS. 36(a) and 36(b) illustrates the twenty-ninth embodiment of the present invention wherein each of the first, second and third mirrors M1, M2 and M3 is employed in the form of a plane reflective mirror having a minimum width, in which case the first, second and third mirrors of minimum width are required to move in a diagonal direction a larger distance than that required in any one of the foregoing embodiments shown respectively in FIGS. 28(a) and 28(b) to FIGS. 35(a) and 35(b).

Figure 37A:
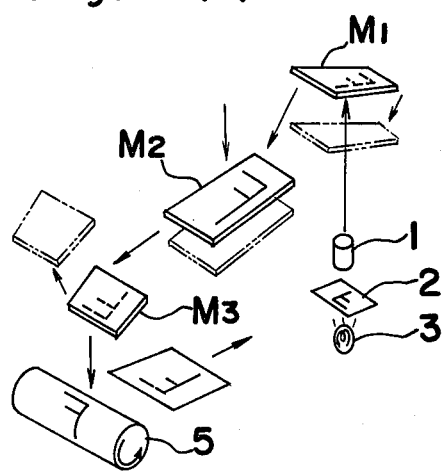
Figure 37B:
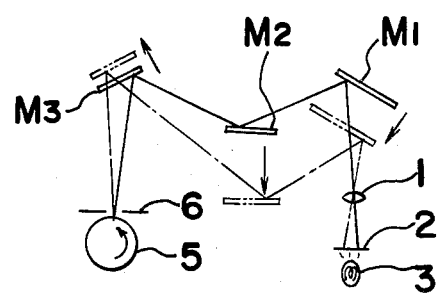
Figure 38A:
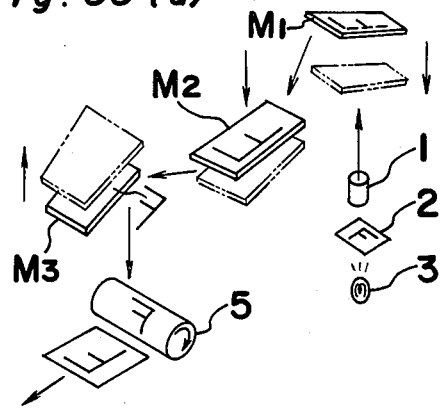
Figure 38B:
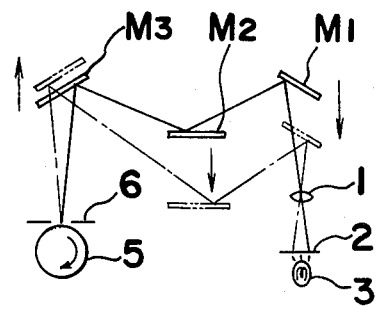
Figure 39A:
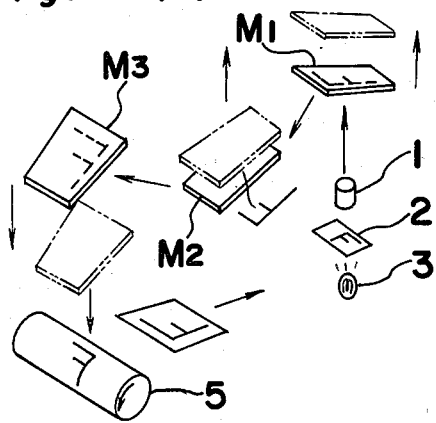
Figure 39B:
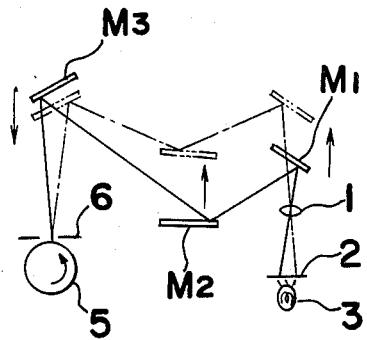
Figure 40A:
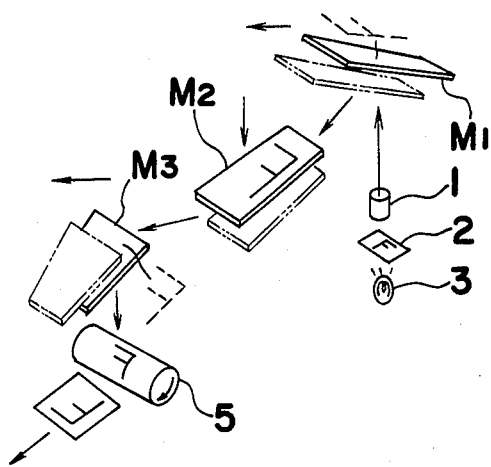
Figure 40B:
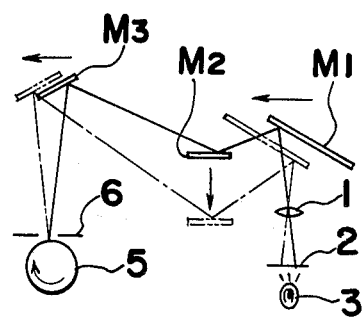
Figure 41A:
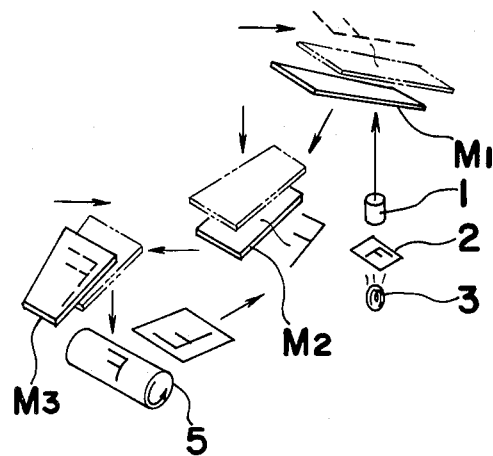
Figure 41B:
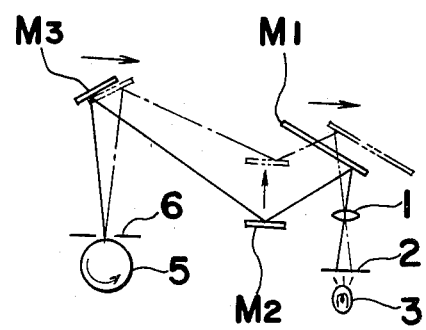

FIGS. 37(a) and 37(b) illustrate the thirtieth embodiment of the present invention wherein the first, second and third mirrors M1, M2 and M3 are supported for movement in respective directions perpendicular to the plane of the reflective surfaces of the corresponding first, second and third mirrors so that each of the first, second and third mirrors M1, M2 and M3 can be moved a smaller distance than that required in any one of the foregoing embodiments of FIGS. 28(a) and 28(b) to FIGS. 36(a) and 36(b). For this purpose, each of the first, second and third mirrors M1, M2 and M3 should be employed in the form of a plane reflective mirror of relatively large width.

Figure 32A:
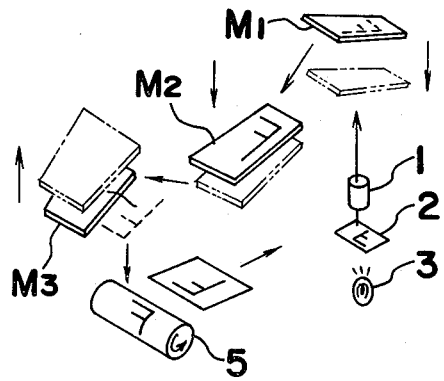
Figure 32B:
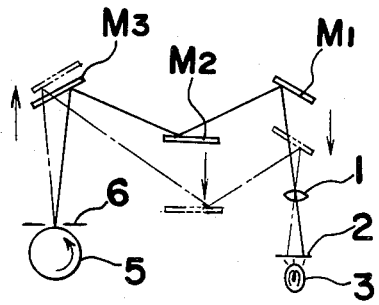
Figure 33A:
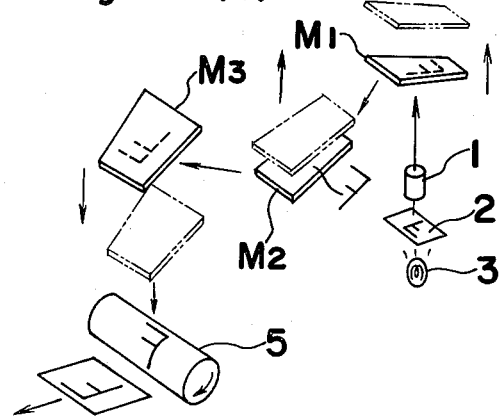
Figure 33B:
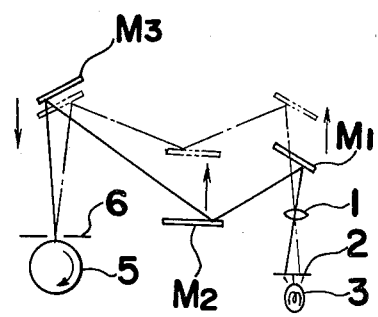
Figure 34A:
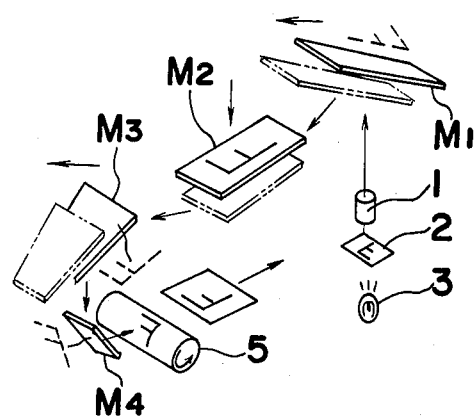
Figure 34B:
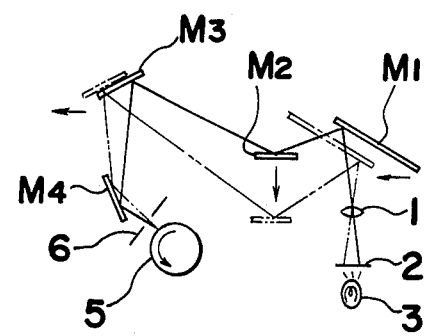
Figure 35A:
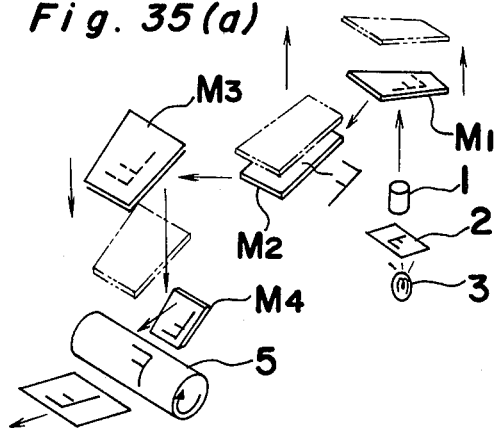
Figure 35B:
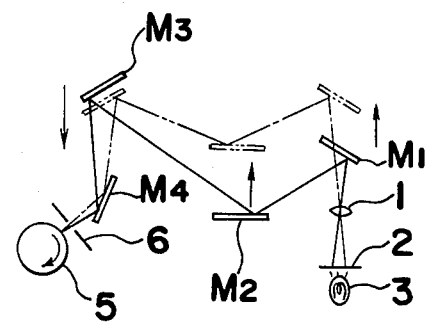

Except that the image projecting system according to any one of thirty-first to thirty-fourth embodiments of the present invention shown respectively in FIGS. 38(a) and 38(b) to FIGS. 41(a) and 41(b) is utilizable in the printer unit of the reader-printer apparatus of which the reader unit is of the construction shown in FIG. 16, these thirty-first to thirty-fourth embodiments are similar to the twenty-fifth embodiment of FIGS. 32(a) and 32(b), the twenty-sixth embodiment of FIGS. 33(a) and 33(b), the twenty-third embodiment of FIGS. 30(a) and 30(b) and the twenty-fourth embodiment of FIGS. 32(a) and 32(b), respectively. However, because of the nature of the construction of the optical system of the reader unit shown in FIG. 16, the direction of rotation of the drum 5 and the direction of transportation of the copying paper employed in any one of the thirty-first to thirty-fourth embodiments of the present invention are opposed respectively to that employed in any one of the twenty-fifth, twenty-sixth, twenty-third and twenty-fourth embodiments of the present invention.

Figure 42:
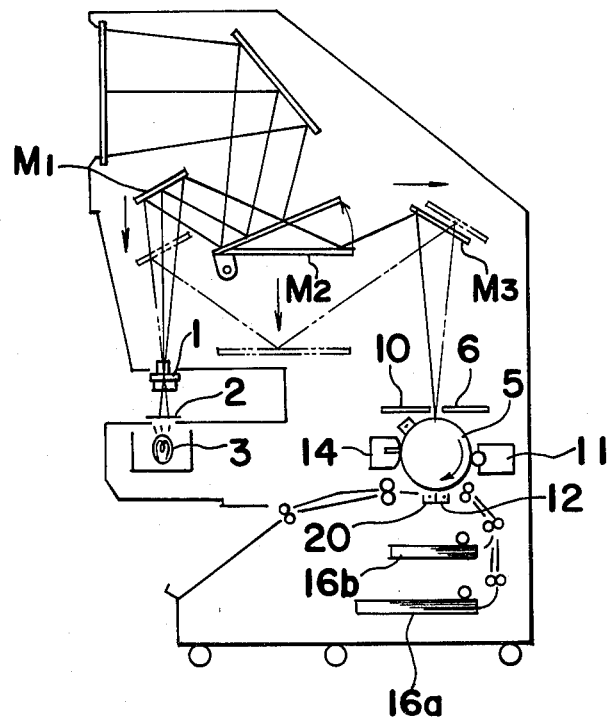
FIGS. 42 and 43 are schematic side elevational views of the combined reader-printer apparatus utilizing the image projecting system according to the present invention.

FIG. 42 illustrates schematically the reader-printer apparatus of a type utilizing three plane reflective mirrors in the optical system of the reader unit and three plane reflective mirrors M1, M2 and M3 in the printer unit, it being to be noted that the mirrors M1 and M2 are concurrently forming two of the three reflective mirrors in the optical system of the reader unit. The mirrors M1, M2 and M3 are arranged in the manner as shown in FIGS. 28(a) and 28(b). In addition, the mirror M2 is supported not only for pivotal movement, but also for movement in a vertical direction.

Figure 43:
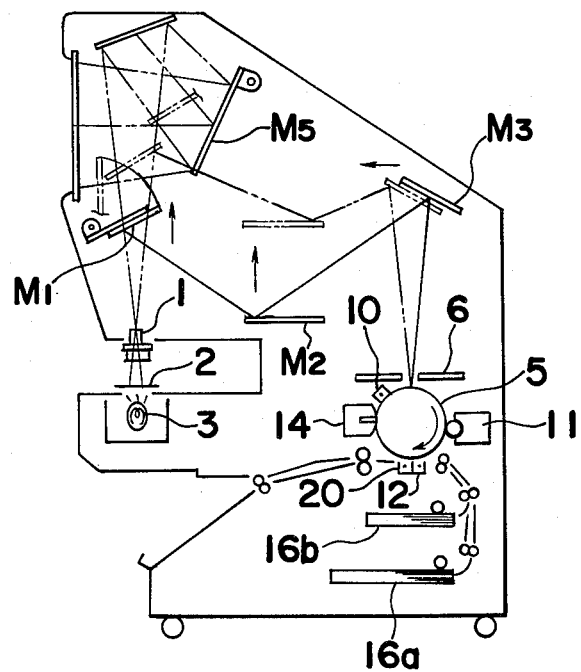

On the other hand, FIG. 43 illustrates schematically the reader-printer apparatus of a type utilizing two plane reflective mirrors in the optical system of the reader unit and three plane reflective mirrors M1, M2 and M3 in the printer unit, said mirrors M1, M2 and M3 being arranged in the manner as shown in FIGS. 29(a) and 29(b). The plane reflective mirror M5 used in the optical system of the reader unit is pivotally supported for movement between operative and inoperative positions respectively shown by the solid and broken lines, said mirror M5 being pivoted to the inoperative position to clear the optical axis of the optical system of the printer unit when the latter is brought into operation. In addition, the mirror M1 is supported not only for pivotal movement between inoperative and operative positions, but also for movement in a vertical direction, it being to be understood that, when the reader unit is brought into operation, the mirror M1 is pivoted to the inoperative position to clear the optical axis of the optical system of the reader unit.

The copying machine employed in the reader-printer apparatus of the construction shown in any one of FIGS. 42 and 43 is similar in construction to that shown in any one of FIGS. 21 and 22, however, it being to be understood that not only a separator charger 20 is additionally provided in the copying machine shown in any one of FIGS. 42 and 43, but also the paper supply unit is shown as comprises of a pair of paper cassettes 16a and 16b one placed above the other.

From the foregoing description of the present invention made in connection with the various preferred embodiments thereof with reference to the accompanying drawings, it has now become clear that, since the image projecting system of the present invention generally comprises a first plane reflective mirror supported at a predetermined angle $\theta$ relative to the direction of travel of the incident beam of light, a second plane reflective mirror supported with its reflective surface lying in a plane perpendicular to the direction of travel of the incident beam of light and a third plane reflective mirror supported at a predetermined angle $(360° - \theta)$ relative to the direction of travel of the incident beam of light and so as to reflect the beam of light in a direction parallel to the direction of travel of the incident beam of light, and since these first, second and third mirrors are moved at respective fixed speeds irrespective of the magnification of the image of a picture recorded on each frame of the microfilm, consecutive portions of the image on the microfilm stationarily supported can successively projected onto the image plane through the slit.

Although the present invention has fully been described in connection with the various preferred embodiments thereof with reference to the accompanying drawings, it is to be noted that various changes and modifications are apparent to those skilled in the art. Such changes and modifications are to be understood as included within the true scope of the present invention unless they depart therefrom.

We claim:

1. An image projecting system which comprises, in combination:

means for stationary supporting an original on a supporting plane;

an image receiving member on which consecutive portions of an image of the original are successively projected through a slit;

means for illuminating the original and carrying the image of the original along an optical path extending from the original to the image receiving member; and first, second and third plane reflective members disposed on said optical path for guiding the rays of light carrying the image of the original towards the image receiving member, said first plane reflective member being supported for movement substantially at a predetermined velocity of $V/2 \sin 2\theta$ in a direction perpendicular to the supporting plane while the reflective surface of said first plane reflective member lies at a first predetermined angle $\theta$ relative to the above direction, said second plane reflective member being supported for movement substantially at a predetermined velocity of $V \tan \theta/2$ in the above direction while the reflective surface of said second plane reflective member lies at right angles to the above direction, and said third plane reflective member being supported for movement substantially at a predetermined velocity of $-V(4 \cos^2 \theta - 1)/2 \sin 2\theta$ in the above direction while the reflective surface of said third plane reflective member lies at a second predetermined angle of $(360° - \theta)$ relative to the above direction, wherein the first predetermined angle $\theta$ has the following relationship;

$0° < \theta < 90°$, wherein $\theta \neq 45°$.

2. A system as claimed in claim 1, wherein each of said first, second and third reflective members is supported for movement in a direction perpendicular to the plane of the corresponding reflective surface.

3. A system as claimed in claim 1, wherein each of said first, second and third reflective members is supported for movement in the above direction.

4. In an electrophotographic copying machine comprising a rotatably supported photoreceptor member adapted to move sequentially past a charging station at which a uniform electrostatic charge is deposited on the photoreceptor member, an exposure station at which a light image corresponding to an original to be reproduced is projected through a projecting lens onto the photoreceptor member to form an electrostatic latent image on the photoreceptor member, a developing station at which a developing material is applied over the photoreceptor member to develop the electrostatic latent image, a transfer station at which the developed image is transferred from the photoreceptor member to a copying medium, and a cleaning station at which residual developing material remaining on the photoreceptor member is removed, and a fixing device for fixing the transferred image onto the copying medium, the improvement wherein an image projecting system for projecting the light image corresponding to the original image to be reproduced onto the photoreceptor member through the projecting lens comprises first, second and third plane reflective members disposed on an optical path extending from the original to the photoreceptor member for guiding the rays of light, said first plane reflective member being supported for movement substantially at a predetermined velocity of $V/2 \sin 2\theta$ in a direction parallel to an axis of the projecting lens while the reflective surface of said first plane reflective member lies at a first predetermined angle $\theta$ relative to the above direction, said second plane reflective member being supported for movement substantially at a predetermined velocity of $V \tan \theta/2$ in the above direction while the reflective surface of said second plane reflective member lies at right angles to the above direction, and said third plane reflective member being supported for movement substantially at a predetermined velocity of $-V(4 \cos^2 \theta - 1)$ relative to the above direction, wherein V represents the velocity of movement of the photoreceptor member and the first predetermined angle $\theta$ has the following relationship;

$0° < \theta < 90°$, wherein $\theta \neq 45°$.

5. A machine as claimed in claim 4, wherein each of the first, second and third reflective members is supported for movement in a direction perpendicular to the plane of the corresponding reflective surface.

6. A machine as claimed in claim 4, wherein each of the first, second and third reflective members is supported for movement in the above direction.

* * * * *